US012481233B2

(12) United States Patent
Taniya

(10) Patent No.: US 12,481,233 B2
(45) Date of Patent: Nov. 25, 2025

(54) BELT DEVICE AND IMAGE FORMING DEVICE

(71) Applicant: SHARP KABUSHIKI KAISHA, Sakai (JP)

(72) Inventor: Keisuke Taniya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/622,017

(22) Filed: Mar. 29, 2024

(65) Prior Publication Data

US 2024/0385552 A1 Nov. 21, 2024

(30) Foreign Application Priority Data

May 17, 2023 (JP) ................................ 2023-081820

(51) Int. Cl.
*G03G 15/16* (2006.01)

(52) U.S. Cl.
CPC ... *G03G 15/161* (2013.01); *G03G 2215/1623* (2013.01); *G03G 2215/1661* (2013.01)

(58) Field of Classification Search
None
See application file for complete search history.

(56) References Cited

U.S. PATENT DOCUMENTS

2005/0078991 A1* 4/2005 Kimura .............. G03G 21/0011 399/350
2006/0119029 A1* 6/2006 Kitamura ........... G03G 15/1625 271/275
2007/0110471 A1* 5/2007 Kitamura ............. G03G 15/168 399/101
2014/0174888 A1* 6/2014 Koshida ................. G03G 15/00 198/497
2014/0241751 A1* 8/2014 Morishita ............ G03G 15/161 399/101
2018/0284682 A1* 10/2018 Tsukijima .......... G03G 15/1615
2019/0302654 A1* 10/2019 Ichihashi ............. G03G 15/161
2022/0019159 A1* 1/2022 Kainuma ............. G03G 15/161
2024/0310758 A1* 9/2024 Kawasaki ............ G03G 15/161

FOREIGN PATENT DOCUMENTS

JP 2013-097263 A 5/2013
JP 2017-040705 A 2/2017

* cited by examiner

*Primary Examiner* — Sevan A Aydin
(74) *Attorney, Agent, or Firm* — ScienBiziP, P.C.

(57) ABSTRACT

A belt device includes a cleaning unit having a cleaning member that abuts a belt and cleans a front surface of the belt. A tension roller includes a deviation suppression mechanism on one side of and in a width direction of the tension roller. The width direction intersects a transport direction of the belt. The deviation suppression mechanism suppresses deviation of the belt in the width direction by tilting a rotary shaft of the tension roller. The cleaning member has one side in the width direction tiltable that follows tilting of the tension roller. The cleaning unit includes a port, for discharging toner removed from the front surface of the belt, on a downstream side of the cleaning member and in a transport direction of the toner. The downstream side is another side in the width direction.

3 Claims, 8 Drawing Sheets

BELT DEVICE AND IMAGE FORMING DEVICE

TECHNICAL FIELD

The disclosure relates to a belt device and an image forming device including the belt device.

BACKGROUND ART

Some image forming devices adopt an intermediate transfer system. These image forming devices adopting an intermediate transfer system include a plurality of process units disposed around an intermediate transfer belt and primarily transfer toner images formed by respective process units onto the intermediate transfer belt. The toner images primarily transferred onto the intermediate transfer belt are secondarily transferred from the intermediate transfer belt onto a recording sheet.

The intermediate transfer belt is an endless belt that is wound and rotates around, for example, a driving roller that drives and rotates and a roller that is driven to rotate. To increase a transport force transmitted from the driving roller to the intermediate transfer belt, an idle roller for increasing a winding angle of the driving roller may be provided, or a tension roller for applying tension to the intermediate transfer belt may be provided. This type of belt device may cause the belt to deviate in an axial direction of a rotary shaft of each roller and cause, when such deviation occurs, an end portion of the belt to be damaged. In response to this, providing a regulating member that regulates the deviation of the belt and a meandering adjustment mechanism that adjusts the deviation is known.

When the toner images are transferred from the intermediate transfer belt onto the recording sheet, toner may remain on a front surface of the intermediate transfer belt. Since the residual toner may hinder good image formation, the belt device is preferably provided with a cleaning member for removing and collecting the residual toner. Known cleaning members use, for example, a cleaning blade.

SUMMARY

Technical Problem

A proposed method of removing the toner remaining on the belt by using the cleaning blade interlocks the cleaning blade that cleans the belt with a steering member of the belt and provides, on a collection container fixed to collect the toner removed by the cleaning blade, a sealing member that suppresses scattering of the toner.

Unfortunately, supporting the cleaning blade in conjunction with the steering member and supporting the collection container by fixing the collection container to the device main body causes a gap between the cleaning blade that is inclined and the collection container that is not inclined but fixed, thus tending to cause scattering of the toner to occur. The sealing member is provided bent in the collection container and is deformed in accordance with the inclined state of the cleaning blade, causing the force required for sealing to be a load on a steering operation, increasing the load on the steering member, and leading to malfunction.

The disclosure has been made in view of such problems as described above, and an object of the disclosure is to provide a belt device capable of suppressing the scattering of toner and cleaning a belt without increasing a load on a steering operation and also capable of suppressing deviation of the belt and an image forming device including the belt device.

Solution to Problem

A solution of the disclosure for achieving the object described above is a belt device including a device main body, a driving roller and a driven roller, a belt that is endless, is wound around the driving roller and the driven roller, and rotates in the device main body by the driving roller being rotationally driven, and a cleaning unit including a cleaning member that abuts the belt and cleans a front surface of the belt. The cleaning member is disposed sandwiching the belt between the cleaning member and the driven roller. The driven roller includes, on one side in a width direction intersecting a transport direction of the belt, a deviation suppression mechanism that suppresses deviation of the belt in the width direction by tilting a rotary shaft of the driven roller. The cleaning member is provided with one side in the width direction tiltable following tilting of the driven roller. The cleaning unit includes a transport screw that transports toner removed from the front surface of the belt by the cleaning member. The other side in the width direction is a downstream side in a transport direction of the toner to be transported by the transport screw.

In the belt device having the configuration described above, the cleaning unit preferably includes, on the downstream side of the transport screw in the transport direction of the toner, a discharge port that discharges the toner transported.

In the belt device having the configuration described above, preferably, the cleaning unit includes a collection container into which the toner removed from the front surface of the belt is collected, the collection container is provided detachably on the device main body, and the discharge port is disposed in the collection container with the collection container attached to the device main body.

In the belt device having the configuration described above, preferably, the driven roller is disposed parallel to the driving roller, and the deviation suppression mechanism includes a moving member that is pushed by deviation of the belt and moves in an axial direction of the rotary shaft of the driven roller and a guide member that includes an inclined surface and slides the moving member along the inclined surface.

In the belt device having the configuration described above, the cleaning member is preferably a cleaning blade disposed with a distal end portion of the cleaning member abutting the belt.

An image forming device including the belt device according to each solution described above is also within the scope of the technical idea of the disclosure.

Advantageous Effects of Invention

The disclosure can clean a belt while suppressing scattering of toner and also suppress deviation of the belt.

DESCRIPTION OF EMBODIMENTS

Embodiments of a belt device and an image forming device according to the disclosure will be described below with reference to the drawings.

Figure 1:
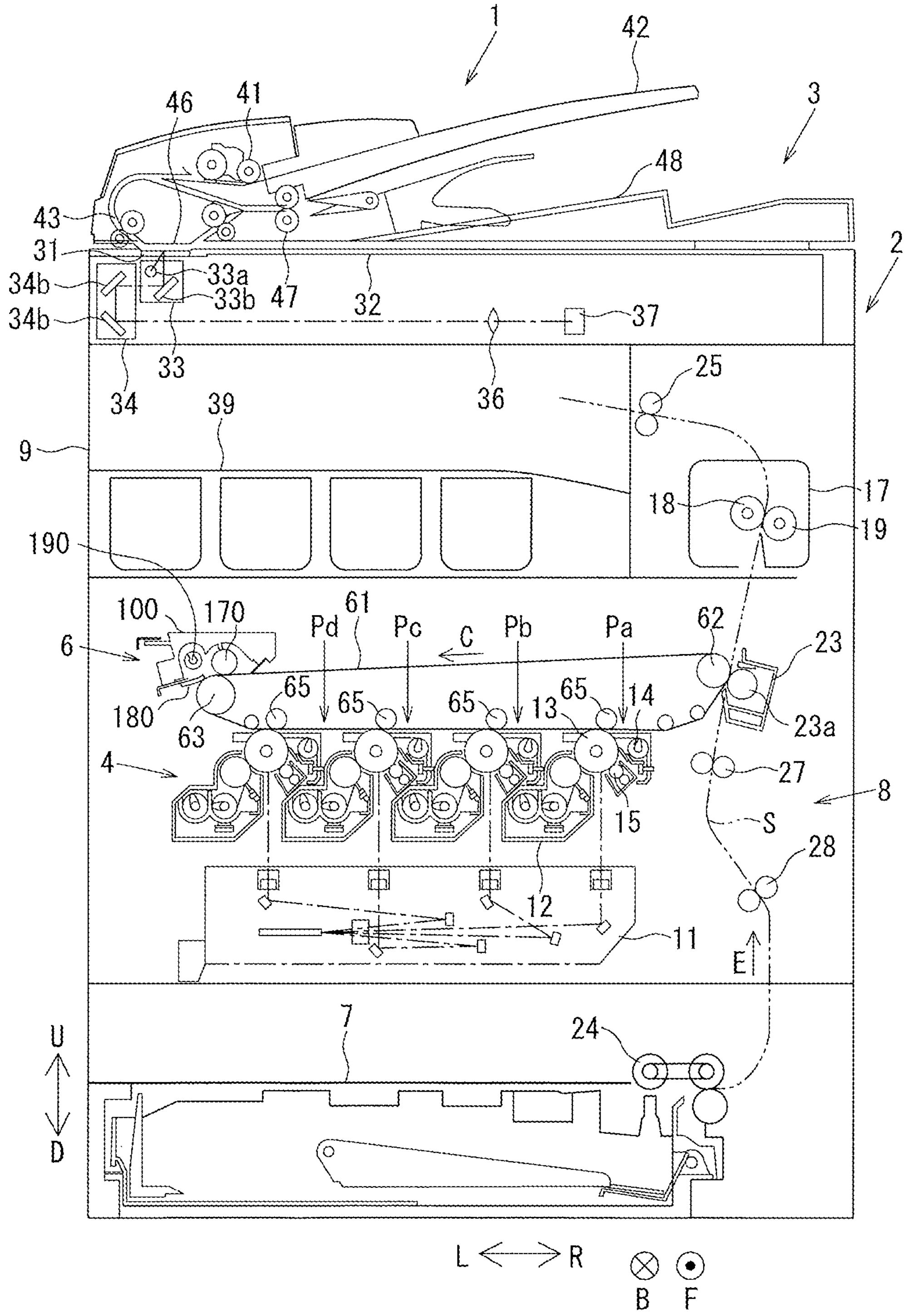
FIG. 1 is a cross-sectional explanatory view illustrating an image forming device according to an embodiment of the disclosure.

FIG. 1 is a cross-sectional explanatory view illustrating an image forming device 1 according to an embodiment. The image forming device 1 reads and prints color images and monochrome images, for example, and has a print function for printing an image on a recording sheet, a scanner function for reading an image of a document, a copy function for reading an image of a document and printing the image of the document on a recording sheet, and the like.

In the drawings, arrow F indicates a front surface side, arrow B indicates a rear (back) surface side, arrow R indicates rightward, arrow L indicates leftward, arrow U indicates upward, and arrow D indicates downward. These arrows are provided for convenience of description and do not limit the installation form and the usage form of the image forming device 1.

The image forming device 1 includes a document reading device 2, a document feeding device 3, a process unit 4, a transfer device 6, a sheet feeding cassette 7, and a sheet feeding device 8. The process unit 4, the transfer device 6, the sheet feeding cassette 7, and the sheet feeding device 8 are housed in a device main body 9. The document reading device 2 and the document feeding device 3 are mounted above the device main body 9. An operation unit such as an operation panel (not illustrated) is also provided on a front surface side of the device main body 9.

The document reading device 2 moves first and second scanning units 33 and 34 while maintaining a predetermined speed relationship therebetween, illuminates a document on a document placement glass 32 by a light source 33*a* of the first scanning unit 33, guides reflected light from the document to an imaging lens 36 by mirrors 33*b* and 34*b* of the first and second scanning units 33 and 34, and forms an image of the document on a charge-coupled device (CCD) 37 by the imaging lens 36. The CCD 37 repeatedly reads an image of a document in a main scanning direction and outputs image data representing the image of the document.

The document feeding device 3 is pivotally supported by the document reading device 2, and a front surface side of the document feeding device 3 is openable and closable. When the document feeding device 3 is opened, a document reading glass 31 and the document placement glass 32 of the document reading device 2 are opened, and a document can be placed on the document placement glass 32.

The document feeding device 3 pulls out a document on a document tray 42 by a pickup roller 41, feeds the document through a document feeding path 43, passes the document between the document reading glass 31 and a counter guide plate 46, and discharges the document from sheet discharge rollers 47 to a sheet discharge tray 48. When a document is fed, the document is illuminated by the light source 33*a* of the first scanning unit 33 through the document reading glass 31, the reflected light from the document is reflected by the mirrors 33*b* and 34*b* of the first and second scanning units 33 and 34 and guided to the imaging lens 36, an image of the document is formed on the CCD 37 by the imaging lens 36, and the image of the document is read by the CCD 37.

The image of the document read by the CCD 37 is output from the CCD 37 as an analog signal, and this analog signal is A/D converted into a digital signal. This digital signal (image data) is subjected to various types of image processing and then input to an optical scanning device 11 of the process unit 4, and an image represented by the image data is formed on a recording sheet in the process unit 4.

To print a color image using each color of black (K), cyan (C), magenta (M), and yellow (Y) or a monochrome image using a single color (for example, black) on a recording sheet, the process unit 4 includes four developing units 12, four photoreceptor drums 13, four drum cleaning devices 14, four charging rollers 15, and four image forming stations Pa, Pb, Pc, and Pd corresponding to black, cyan, magenta, and yellow. The optical scanning device 11 is provided below the image forming stations Pa, Pb, Pc, and Pd.

In each of the image forming stations Pa, Pb, Pc, and Pd, after residual toner on a front surface of the photoreceptor drum 13 is removed and collected by the drum cleaning device 14, the front surface of the photoreceptor drum 13 is uniformly charged to a predetermined potential by the charging roller 15, the front surface of the photoreceptor drum 13 is exposed to light from the optical scanning device 11 to form an electrostatic latent image on the front surface of the photoreceptor drum 13, and the electrostatic latent image on the front surface of the photoreceptor drum 13 is developed by the developing unit 12 to form a toner image on the front surface of the photoreceptor drum 13. This forms toner images of the respective colors on the front surfaces of the photoreceptor drums 13.

The transfer device 6 is a device corresponding to a belt device of the disclosure and includes an intermediate transfer belt 61 that is an endless belt, a belt driving roller 62, a tension roller 63 as a driven roller, and intermediate transfer rollers 65. The belt driving roller 62, the tension roller 63, and the intermediate transfer roller 65 rotate the intermediate transfer belt 61 in a tensioned state. The intermediate transfer rollers 65 each apply a transfer bias for transferring the toner image of the photoreceptor drum 13 onto the intermediate transfer belt 61.

The intermediate transfer belt 61 is provided in contact with each of the photoreceptor drums 13, is transported in a transport direction C, and the toner images of the respective colors formed on the photoreceptor drums 13 are sequentially superimposed and transferred onto the intermediate transfer belt 61, thereby forming a color toner image (multicolor toner image) on the intermediate transfer belt 61. Each toner image is transferred from the photoreceptor drum 13 to the intermediate transfer belt 61 by the intermediate transfer roller 65 that is in contact with a back side of the intermediate transfer belt 61. The toner images formed on the photoreceptor drums 13 in accordance with the respective colors are layered on the intermediate transfer belt 61.

As the intermediate transfer belt 61 rotates, the toner images are transferred onto a recording sheet such as a sheet by the secondary transfer device 23. A nip region is present between the intermediate transfer belt 61 and a secondary transfer roller 23*a* of the secondary transfer device 23, and the toner images on the intermediate transfer belt 61 are transferred onto the recording sheet while the recording sheet fed through a sheet feeding path S is nipped in the nip region and fed. In a fixing device 17, the recording sheet is interposed between a heating roller 18 and a fixing roller 19 and is heated and pressurized to fix the toner images onto the recording sheet.

The transfer device 6 according to the illustrated mode is provided with a cleaning unit 100. The cleaning unit 100 removes and collects the toner remaining on the intermediate transfer belt 61. The cleaning unit 100 includes a cleaning roller 170 and a cleaning blade 180 as cleaning members that come into contact with the intermediate transfer belt 61 to clean the intermediate transfer belt 61.

In the sheet feeding device 8, the recording sheet is pulled out from the sheet feeding cassette 7 by a pickup roller 24, is fed through the sheet feeding path S, passes through the secondary transfer device 23 and the fixing device 17, and is discharged onto a sheet discharge tray 39 via sheet discharge rollers 25. In the sheet feeding path S, there are disposed registration rollers 27, transport rollers 28, and the like. The registration rollers temporarily stop the recording sheet to align a distal end of the recording sheet, and subsequently resume feeding of the recording sheet in synchronization with a transfer timing of the toner images in the nip region between the intermediate transfer belt 61 and the transfer roller 23*a*. The transport rollers 28 or the like urge feeding of the recording sheet.

Figure 2:
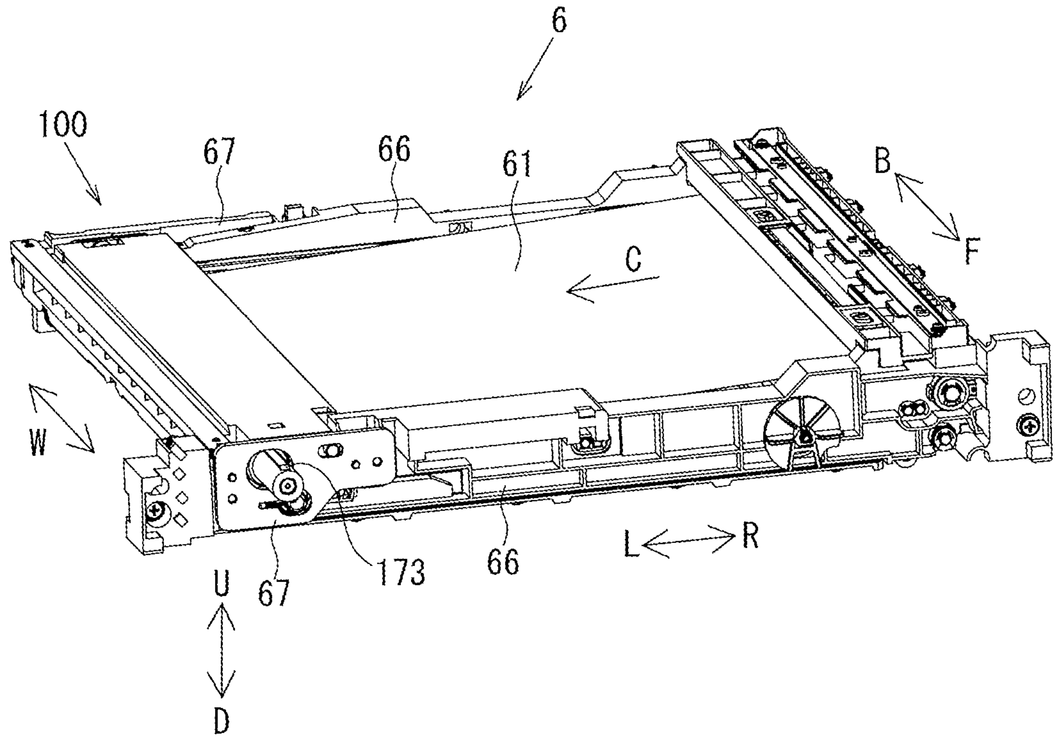
FIG. 2 is a perspective view illustrating a transfer device provided in the image forming device.
Figure 3:
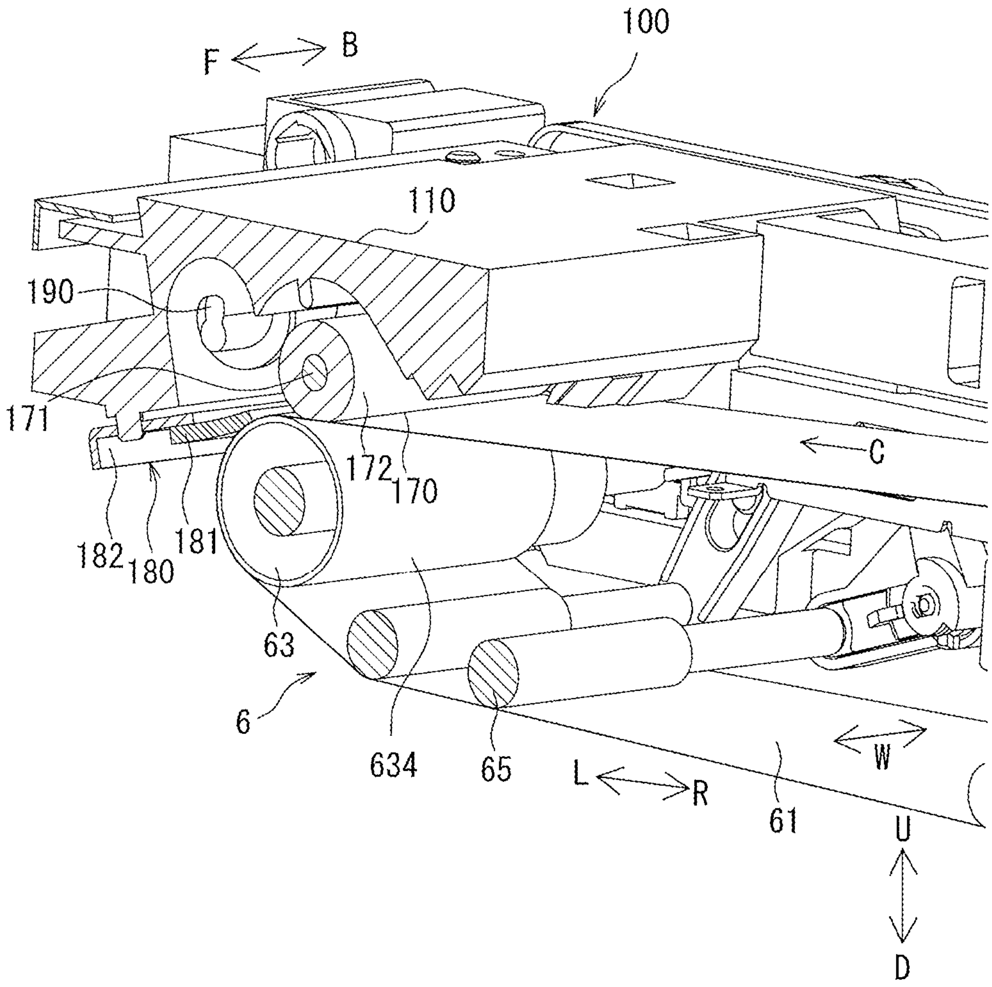
FIG. 3 is a cross-sectional perspective view illustrating the transfer device part of which is cut away.

FIG. 2 is a perspective view illustrating the transfer device 6 included in the image forming device 1 according to an embodiment. FIG. 3 is a cross-sectional perspective view illustrating the transfer device 6 part of which is cut away and the cleaning unit 100 part of which is cut away.

As illustrated in FIG. 1, the transfer device 6 includes the intermediate transfer belt 61, the belt driving roller 62, the tension roller 63, the intermediate transfer rollers 65, and the cleaning unit 100. Among them, as illustrated in FIG. 2, the belt driving roller 62, the tension roller 63, and the intermediate transfer rollers 65 are supported so as to be sandwiched from both front and rear sides by a pair of main body frames 66 provided at front and rear sides.

The cleaning unit 100 is disposed above the intermediate transfer belt 61. The cleaning unit 100 is supported by the main body frames 66 via a pair of front and rear fixing frames 67 constituting the device main body. The cleaning unit 100 transports residual toner, paper dust, and the like (hereinafter, simply referred to as toner) removed from a front surface of the intermediate transfer belt 61 by a transport screw 190 provided in a housing 110 with the direction from the rear surface side to the front surface side being the transport direction, and discharges the toner from a discharge port (discharge port 174 described below) of a toner discharge portion 173 provided on the front surface side.

As illustrated in FIG. 3, the cleaning roller 170 and the cleaning blade 180 are provided inside the housing 110 of the cleaning unit 100. The cleaning roller 170 includes a rotary shaft 171 and a cleaning portion 172. The cleaning portion 172 is provided outside the rotary shaft 171 and may be made of a porous elastic material such as silicon sponge or urethane or may be a brush with fine fibers.

The cleaning roller 170 is disposed with the cleaning portion 172 in contact with the intermediate transfer belt 61 and is rotatably supported by the housing 110. The rotary shaft 171 of the cleaning roller 170 is disposed orthogonal to the transport direction C of the intermediate transfer belt 61. The rotation of the cleaning roller 170 allows the intermediate transfer belt 61 to be cleaned by the cleaning portion 172 and the toner remaining on the intermediate transfer belt 61 is removed and collected.

The cleaning blade 180 is disposed on the downstream side of the cleaning roller 170 in the transport direction C of the intermediate transfer belt 61 and is supported by the housing 110. In the cleaning blade 180, a blade 181 formed of a material such as rubber is attached to a support portion 182 formed of a sheet metal, for example. A distal end portion of the blade 181 is disposed abutting the front surface of the intermediate transfer belt 61 to clean the intermediate transfer belt 61 and remove and collect the toner remaining on the intermediate transfer belt 61.

The cleaning roller 170 and the cleaning blade 180 are disposed sandwiching the intermediate transfer belt 61 between the cleaning roller 170 and the tension roller 63 and between the cleaning blade 180 and the tension roller 63, respectively. Given a width direction W as the direction of the intermediate transfer belt 61 that intersects the transport direction C of the intermediate transfer belt 61, the cleaning roller 170 and cleaning blade 180 (blade 181) are disposed parallel to the tension roller 63 and also parallel to the width direction W. The tension roller 63 abuts the cleaning roller 170 and the blade 181 with the intermediate transfer belt 61 interposed therebetween and is pressed in the direction of the cleaning roller 170 and the blade 181 by a biasing force described below.

As the cleaning member of the cleaning unit 100, the cleaning blade 180 that abuts the intermediate transfer belt 61 need only be provided, and the cleaning roller 170 need not necessarily be provided. The cleaning blade 180 need not necessarily be provided at the illustrated position as long as the intermediate transfer belt 61 is interposed between the distal end portion of the blade 181 and the tension roller 63.

Figure 4:
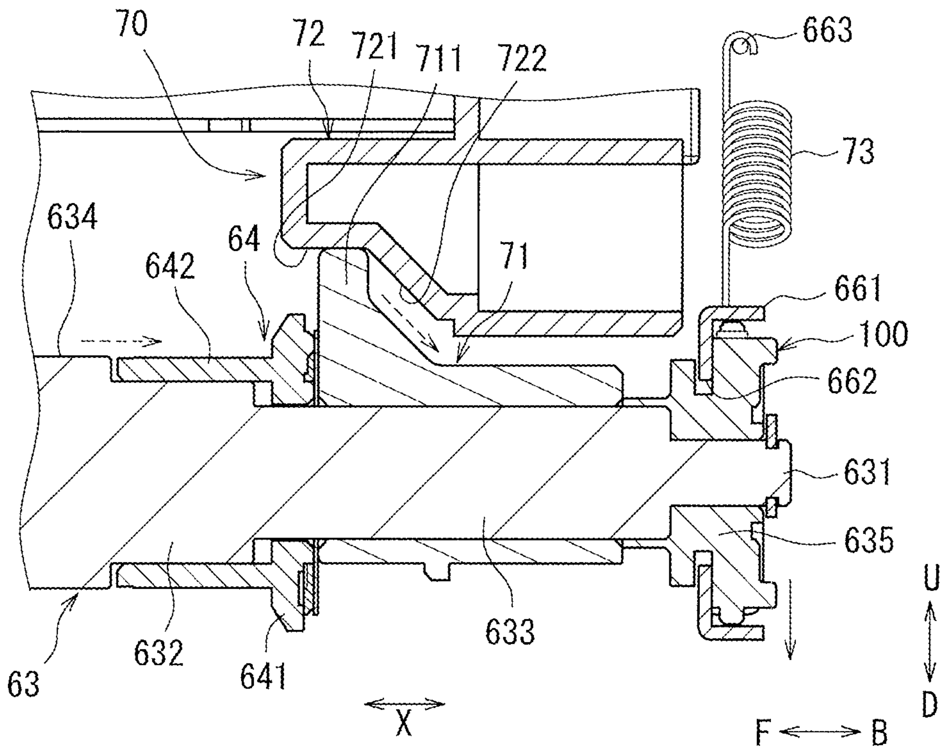
FIG. 4 is a cross-sectional view illustrating a deviation suppression mechanism provided in the transfer device.

A deviation suppression mechanism 70 that suppresses deviation of the intermediate transfer belt 61 is provided on a rear surface side, which is a first side in the width direction W, whereas the discharge port 174 of the toner from the cleaning unit 100 is provided on a front surface side, which is a second side in the width direction W. FIG. 4 is a cross-sectional view illustrating a configuration of the deviation suppression mechanism 70. As illustrated, the deviation suppression mechanism 70 is provided at an end portion of a rotary shaft 631 of the tension roller 63, on a rear surface side. The deviation suppression mechanism 70 is not provided on a front surface side of the rotary shaft 631.

The tension roller 63 includes the rotary shaft 631 and a body portion 634 that abuts an inner surface of the intermediate transfer belt 61 (not illustrated). The tension roller 63 is provided parallel to the belt driving roller 62 at a reference position. The rotary shaft 631 includes a large-diameter portion 632 and a small-diameter portion 633 having an outer diameter smaller than that of the large-diameter portion 632. A regulating member 64 is externally mounted on the large-diameter portion 632.

The regulating member 64 is provided slidable in an axial direction X with respect to the large-diameter portion 632 of the rotary shaft 631 and rotatable about the rotary shaft 631. The regulating member 64 includes, for example, a pressing portion 641 provided in a flange shape and a cylindrical portion 642. In the regulating member 64, when the intermediate transfer belt 61 moves to one side in the axial direction X, resulting in deviation, the pressing portion 641 is pushed by an end edge of the intermediate transfer belt 61, and the cylindrical portion 642 slides on the large-diameter portion 632 by the pressing force, moving in the axial direction X. A similar regulating member 64 is also provided at an end portion of the rotary shaft 631 of the tension roller 63, on a front surface side. A bearing portion 635 is provided at an end portion of the rotary shaft 631.

The deviation suppression mechanism 70 includes a moving member 71, a guide member 72, and a biasing member 73 at the end portion of the rotary shaft 631 on the rear surface side. The moving member 71 is provided adjacent to the regulating member 64, is externally mounted on the small-diameter portion 633 of the rotary shaft 631 and is movable in the axial direction X along the small-diameter portion 633. As illustrated, the moving member 71 is formed in a cylindrical shape, is externally fitted to the small-diameter portion 633 and includes a sliding protrusion 711 protruding outward in a radial direction at a portion of an outer circumferential surface thereof in the circumferential direction. The moving member 71 is pushed in the axial direction X of the rotary shaft 631 of the tension roller 63 and is movable in the axial direction X via the regulating member 64 that is pushed by deviation of the intermediate transfer belt 61 and moves.

The guide member 72 includes a reference surface 721 and an inclined surface 722. The reference surface 721 is a flat surface provided above and facing the moving member 71. The inclined surface 722 is an inclined surface formed inclined at a downward slope from the reference surface 721 toward the rear surface side. The sliding protrusion 711 of the moving member 71 is provided with an upper end surface of the sliding protrusion 711 abutting the reference surface 721 of the guide member 72.

When the moving member 71 moves to the rear surface side in the axial direction X, the sliding protrusion 711 moves from a state of abutting the reference surface 721 of the guide member 72 and slides along the inclined surface 722. As the sliding protrusion 711 moves toward the rear surface side, the end portion, on the rear surface side, of the rotary shaft 631 of the tension roller 63 to which the moving member 71 is externally fitted moves downward and inclines.

The bearing portion 635 of the tension roller 63 is supported by a support member 661 provided in the main body frame 66 of the transfer device 6. The support member 661 is provided with an elongated hole 662 into which the bearing portion 635 is movably fitted. One end portion of the biasing member 73 is locked to the bearing portion 635, and the other end portion is supported by the locking portion 663 of the support member 661. The bearing portion 635 is biased upward by the biasing member 73 and is provided so that an upper end surface of the sliding protrusion 711 is positioned on the reference surface 721 of the guide member 72 by the biasing force (reference position).

The moving member 71 slides in the axial direction X by the pressing from the regulating member 64, and the sliding protrusion 711 slides on the reference surface 721 of the guide member 72 and then slides on the inclined surface 722. While sliding on the inclined surface 722, the moving member 71 receives a reaction force including a downward component from the inclined surface 722. An end portion of the tension roller 63 including the bearing portion 635 is pushed downward via the moving member 71, and a rear surface side of the tension roller 63 inclines downward.

This causes a force for returning the intermediate transfer belt 61 to its original position to act on the intermediate transfer belt 61 by the action of the biasing member 73, correcting the deviation of the intermediate transfer belt 61. The regulating member 64 is released from the pressing of the intermediate transfer belt 61. A force for returning the bearing portion 635 to the reference position exceeds the force for pushing down the bearing portion 635 via the moving member 71, and thus the bearing portion 635 returns to the reference position and the moving member 71 and the regulating member 64 return to original positions (return operation).

As described above, the deviation suppression mechanism 70 is provided only on the rear surface side. Here, for example, in the contact region of the belt driving roller 62 with the intermediate transfer belt 61, an outer diameter of the belt driving roller 62 on the rear surface side in the axial direction X is provided larger than an outer diameter on the front surface side. This causes, when the intermediate transfer belt 61 rotates, a force for forcibly moving the intermediate transfer belt 61 to the rear surface side to act on the intermediate transfer belt 61.

In this case, the deviation suppression mechanism 70 acts to return the intermediate transfer belt 61 to the front surface side on the opposite side, against the forced movement of the intermediate transfer belt 61 to the rear surface side. When the intermediate transfer belt 61 rotates and moves to the rear surface side, a force for movement to the rear surface side is applied to the deviation suppression mechanism 70. The deviation suppression mechanism 70 reverses, at a position where the force balances the force for moving the intermediate transfer belt 61 to the rear surface side, an acting force so as to move the intermediate transfer belt 61 to the front surface side. This causes, when the intermediate transfer belt 61 moves to the front surface side, a force for forcibly moving the intermediate transfer belt 61 to the rear surface side to act and allows a force acting at a position where the force balances the force for moving the intermediate transfer belt 61 to the front surface side to reverse and move the intermediate transfer belt 61 to the rear surface side. In this way, the movement operation and the return operation are repeated to correct the deviation of the intermediate transfer belt 61.

The mechanism for correcting the deviation of the intermediate transfer belt 61 by just the deviation suppression mechanism 70 provided on the rear surface side is not limited to the configuration described above, and the deviation may be corrected by, for example, a known configuration (refer to, for example, JP 2010-19899 A) in which the rotary shaft 631 of the tension roller 63 is inclined, causing the intermediate transfer belt 61 to deviate to the rear surface side in advance.

Figure 5:
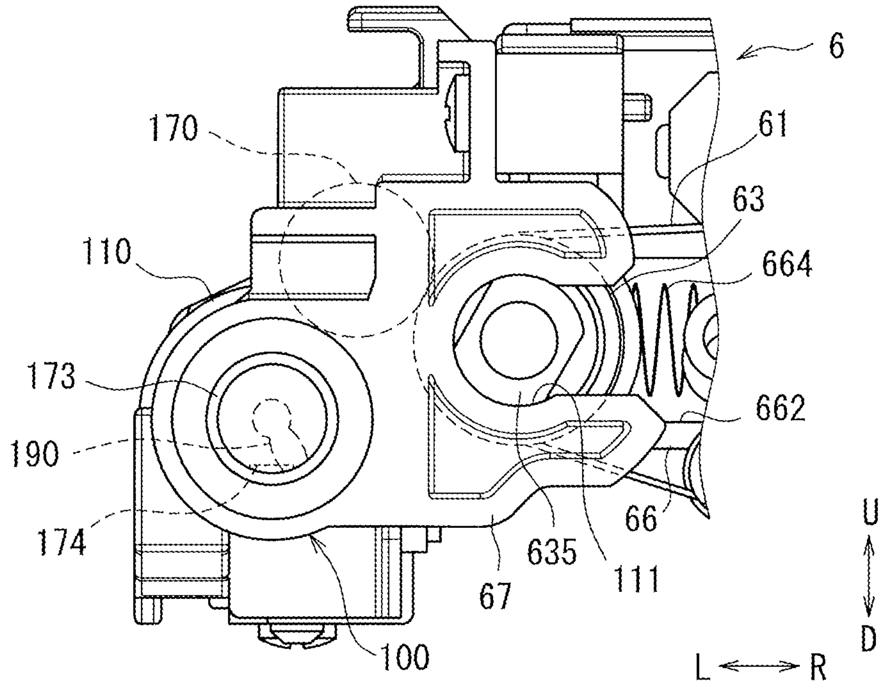
FIG. 5 is a front view illustrating part of the transfer device as viewed from a front surface side.

FIG. 5 is a front view illustrating part of the left side of the transfer device 6 where the cleaning unit 100 is provided as viewed from the front surface side. The tension roller 63 is biased to the left side in the drawing by a biasing member 664 connected to the bearing portion 635 of the rotary shaft 631. The tension roller 63 abuts the cleaning roller 170 with the intermediate transfer belt 61 interposed therebetween and is pressed in the direction of the cleaning roller 170 by the biasing force. The cleaning blade 180 is also pressed in the same manner.

The cleaning blade 180 abuts the tension roller 63 with the intermediate transfer belt 61 interposed therebetween, requiring the cleaning blade 180 to block and scrape off the toner on the front surface of the intermediate transfer belt 61. In response to this, in the present embodiment, the bearing portion 635 of the tension roller 63 is held by a holding portion 111 having a recessed shape and provided in the housing 110 of the cleaning unit 100 and is supported so that the housing 110 moves following a vertical movement (tilting of the rotary shaft 631) of the end portion of the tension roller 63 including the bearing portion 635. As a result, the cleaning unit 100 is configured so that its tilting in the axial direction X is interlocked with the tilting of the rotary shaft 631 of the tension roller 63. The cleaning blade 180 and the cleaning roller 170 are provided tiltable following the tilting of the rotary shaft 631 of the tension roller 63 and are provided so as to hold a state of abutting the intermediate transfer belt 61.

Figure 6:
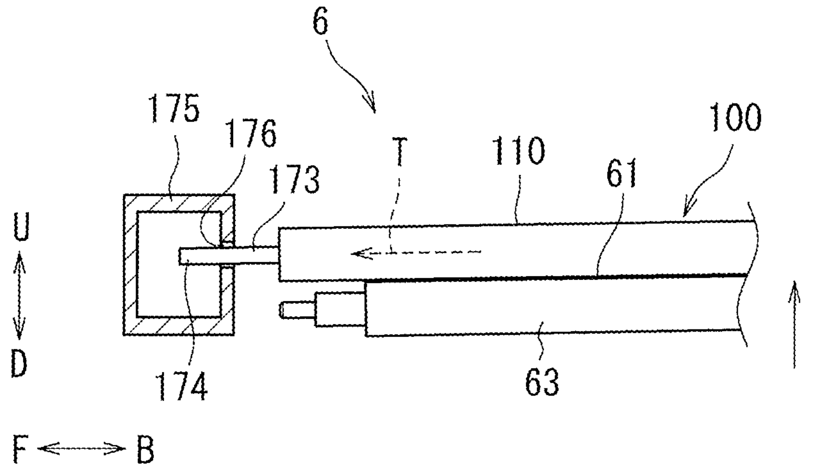
FIG. 6 is an explanatory view schematically illustrating a front surface side of a cleaning unit and a tension roller of the transfer device.
Figure 7:
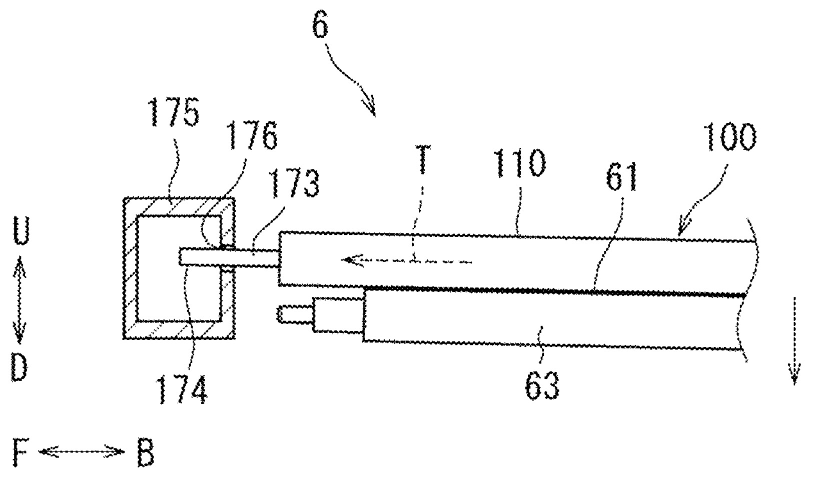
FIG. 7 is an explanatory view schematically illustrating the front surface side of the cleaning unit and the tension roller of the transfer device.

FIG. 6 and FIG. 7 are explanatory views schematically illustrating the front surface side of the cleaning unit 100 and the tension roller 63. In the transfer device 6, the deviation suppression mechanism 70 is provided on the rear surface side, whereas the toner discharge portion 173 that discharges the toner (residual toner) removed from the front surface of the intermediate transfer belt 61 and a collection container 175 into which the toner is collected are provided on the front surface side.

As described above, the cleaning blade 180 (and the cleaning roller 170) and the tension roller 63 abut each other with the intermediate transfer belt 61 interposed therebetween. Then, on the front surface side of the cleaning unit 100 including the cleaning blade 180, as illustrated, the toner discharge portion 173 is extended. The discharge port 174 opening downward is provided at a distal end portion of the toner discharge portion 173.

In the housing 110, the residual toner, paper dust, and the like removed from the front surface of the intermediate transfer belt 61 by the cleaning blade 180 are transported in a transport direction T from the rear surface side to the front surface side by the transport screw 190 and guided to the front surface side through the toner discharge portion 173. The collection container 175 is provided detachably on a front surface side of the transfer device 6 which is the downstream side in the transport direction T. When the collection container 175 is mounted on the fixing frame 67 of the device main body, the toner discharge portion 173 is inserted into the collection container 175 and the discharge port 174 is disposed in the collection container 175. The residual toner, paper dust, and the like are discharged into the collection container 175 from the discharge port 174 provided on a front surface side of the toner discharge portion 173.

An insertion hole 176 into which the toner discharge portion 173 is inserted is open in the collection container 175. As described above, although the cleaning unit 100 is provided tiltable following the tilting of the rotary shaft 631 of the tension roller 63, an end portion on the rear surface side is vertically moved and tilted, and an end portion on the front surface side does not move. Therefore, as illustrated in FIG. 6, even when the cleaning unit 100 (and the cleaning blade 180; not illustrated) is inclined upward following the upward inclination of the tension roller 63, the tilting of the front surface side of the cleaning unit 100 is slight, and the toner discharge portion 173 is stably disposed in the collection container 175. As illustrated in FIG. 7, when the cleaning unit 100 (and the cleaning blade 180; not illustrated) is inclined downward following the downward inclination of the tension roller 63, the tilting of the front surface side of the cleaning roller 170 is also slight, and the toner discharge portion 173 remains stably disposed in the collection container 175.

Figure 8:
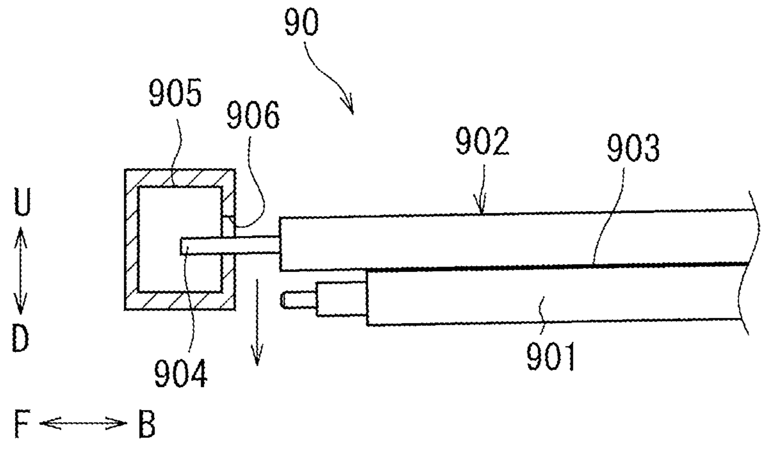
FIG. 8 is an explanatory view schematically illustrating a front surface side of a cleaning unit and a tension roller of a transfer device according to a reference example.

Here, as in a transfer device 90 serving as a reference example illustrated in FIG. 8, in a case in which a tension roller 901 is configured to be fixed at a rear surface side and tilt at a bearing portion (not illustrated) provided on a front surface side, when the front surface side of the tension roller 901 tilts downward, for example, the rear surface side tilts upward. A cleaning unit 902 follows the tilting of the tension roller 901 with an intermediate transfer belt 903 interposed therebetween. In the cleaning unit 902, a front surface side thereof tilts more than a rear surface side thereof that is fixed. Therefore, a gap between a toner discharge portion 904 and an insertion hole 906 of a collection container 905 is large compared to that in FIG. 6 and FIG. 7, resulting in the possibility that the collected residual toner, paper dust, and the like will scatter from the gap. In response to this, in the transfer device 6 according to the present embodiment illustrated in FIG. 6 and FIG. 7, the gap between the toner discharge portion 173 and the insertion hole 176 of the collection container 175 can be reduced, and thus the possibility of such scattering can be remarkably reduced.

Accordingly, in the transfer device 6 and the image forming device 1 according to the disclosure, it is possible to clean the intermediate transfer belt 61 while suppressing the scattering of the toner and the like collected by the cleaning unit 100, and it is possible to suppress the deviation of the intermediate transfer belt 61, thereby eliminating the problems in the related art and making good image formation possible. The problem that the load on the steering operation of the tension roller 63 increases due to the suppression of the scattering of the collected toner and the like does not occur, making it possible to suppress the occurrence of malfunction as well.

In the transfer device 6 configured as described above, a plurality of rollers including the counter roller provided facing and contacting the cleaning blade with the intermediate transfer belt interposed therebetween, the driven roller provided facing the intermediate transfer belt on the side opposite to the driving roller, and the tension roller that applies tension to the intermediate transfer belt are often individually provided. However, in the transfer device 6 of the disclosure, the functions of the plurality of rollers can be integrated into a single tension roller 63, making it possible to reduce the size of the device and reduce costs.

As the image forming device 1, a multifunction machine capable of forming a multicolor or monochrome image on a recording medium in accordance with image data transmitted from an external source or image data from a document by the document reading device 2 or the like has been described as an example, but the image forming device of the disclosure is not limited thereto.

The disclosure is not limited to the embodiments described above, and various modifications can be made without departing from the technical gist of the disclosure. All technical matters included in the technical idea described in the claims are included in the scope of the disclosure. Although the embodiments described above illustrate preferred examples, various modified examples can be realized from the disclosed contents, and such modified examples are also included in the technical scope described in the claims.

REFERENCE SIGNS LIST

1 Image forming device
6 Transfer device (belt device)
61 Intermediate transfer belt (belt)
62 Belt driving roller (driving roller)
63 Tension roller (driven roller)
631 Rotary shaft
632 Large-diameter portion
633 Small-diameter portion
634 Body portion
635 Bearing portion
64 Regulating member
641 Pressing portion

642 Cylindrical portion
65 Intermediate transfer roller
66 Main body frame
661 Support member
662 Elongated hole
663 Locking portion
664 Biasing member
67 Fixing frame
70 Deviation suppression mechanism
71 Moving member
711 Sliding protrusion
72 Guide member
721 Reference surface
722 Inclined surface
73 Biasing member
9 Device main body
100 Cleaning unit
110 Housing
111 Holding portion
170 Cleaning roller
171 Rotary shaft
172 Cleaning portion
173 Toner discharge portion
174 Discharge port
175 Collection container
176 Insertion hole
180 Cleaning blade
190 Transport screw

The invention claimed is:

1. A belt device, comprising:

a device main body;

a driving roller and a driven roller;

a belt that is endless and wound around the driving roller and the driven roller, and that rotates in the device main body by the driving roller being rotationally driven; and a cleaning unit including a cleaning blade disposed sandwiching the belt between the cleaning blade and the driven roller in a state in which a distal end portion of the cleaning blade abuts the belt, wherein:

the driven roller includes, on one side in a width direction intersecting a transport direction of the belt, a moving member that inclines a rotary shaft of the driven roller when the moving member is pushed by a deviation of the belt and moved to the one side, the cleaning blade is provided in the cleaning unit with one side of the cleaning blade in the width direction parallel to the width direction intersecting the transport direction of the belt tiltable following tilting of the rotary shaft of the driven roller, the cleaning unit further includes a transport screw that transports toner removed from a front surface of the belt by the cleaning blade, another side of the cleaning blade in the width direction is a downstream side in a transport direction of the toner to be transported by the transport screw, the cleaning unit further includes, on the downstream side of the transport screw in the transport direction of the toner, a discharge port that discharges the transported toner, the cleaning unit further includes a collection container into which the toner removed from the front surface of the belt is collected, the collection container is provided detachably on the device main body, the discharge port is disposed in the collection container with the collection container attached to the device main body, and the driven roller does not include the moving member on another side in the width direction intersecting the transport direction of the belt.

2. The belt device according to claim 1, wherein the driven roller is disposed parallel to the driving roller, the driven roller further includes a guide member on the one side in the width direction, and the guide member includes an inclined surface such that the moving member slides on the inclined surface and moves one side of the rotary shaft in an axial direction downward when the moving member is pushed by the deviation of the belt and is moved to the one side in the width direction.

3. An image forming device, comprising:

the belt device according to claim 1.

* * * * *